United States Patent [19]
Kitahara et al.

[11] Patent Number: 6,073,078
[45] Date of Patent: Jun. 6, 2000

[54] VEHICLE WITH MILLIMETER-WAVE RADAR

[75] Inventors: Yasuo Kitahara, Hiratsuka; Kunihiro Yamasaki, Isehara; Taku Murakami, Yamato, all of Japan

[73] Assignee: Komatsu Ltd., Tokyo, Japan

[21] Appl. No.: 09/101,977

[22] PCT Filed: Jan. 29, 1997

[86] PCT No.: PCT/JP97/00205

§ 371 Date: Jul. 30, 1998

§ 102(e) Date: Jul. 30, 1998

[87] PCT Pub. No.: WO97/28458

PCT Pub. Date: Aug. 7, 1997

[30] Foreign Application Priority Data

Jan. 31, 1996 [JP] Japan ................................. 8-035750

[51] Int. Cl.[7] .................................................. G06F 15/50
[52] U.S. Cl. .......................... 701/300; 701/301; 342/179
[58] Field of Search .................................. 701/300, 301, 701/217; 342/179

[56] References Cited

U.S. PATENT DOCUMENTS

| | | | |
|---|---|---|---|
| 4,495,580 | 1/1985 | Keearns | 343/450 |
| 5,202,692 | 4/1993 | Huguenin et al. | 342/179 |
| 5,587,929 | 12/1996 | League et al. | 364/516 |

FOREIGN PATENT DOCUMENTS

| | | |
|---|---|---|
| 61-70618 | 4/1986 | Japan . |
| 63-271182 | 11/1988 | Japan . |
| 3-255253 | 11/1991 | Japan . |
| 4-276582 | 10/1992 | Japan . |
| 5-52934 | 3/1993 | Japan . |
| 6-168400 | 6/1994 | Japan . |
| 8-75848 | 3/1996 | Japan . |

*Primary Examiner*—Williams A. Cuchlinski, Jr.
*Assistant Examiner*—Arthur D. Donnelly
*Attorney, Agent, or Firm*—Sidley & Austin

[57] ABSTRACT

The present invention relates to a vehicle with a millimeter-wave radar capable of traveling without incurring ground clutter and without the influence of pitching of the vehicle. Accordingly, a millimeter-wave transmitting/receiving antenna (2) fixed on the front surface of the vehicle (1) has an antenna beam width ($\theta$) of about 4 degrees, an antenna fixing height (h) measured from a ground surface of about 1 meter to 2 meters, and a horizontal angle ($\beta$) of a center (C) of the antenna beam of not less than −4 degrees. This vehicle may also be provided with a storage element (231) for storing course data (A) for the vehicle (1) in advance, an extraction element (232) for extracting a superimposed object (P3), and an identification element (233) for comparing the superimposed object (P3) with the course data (A) and identifying the superimposed object (P3).

15 Claims, 5 Drawing Sheets

VEHICLE WITH MILLIMETER-WAVE RADAR

TECHNICAL FIELD

The present invention relates to a vehicle with a millimeter-wave radar and, more particularly, to a vehicle with a millimeter-wave radar suitable for a vehicle for construction operation on an unpaved road surface.

BACKGROUND ART

Attempts to equip a vehicle with an ultrasonic sensor, laser radar, infrared radar, picture sensor, electric wave radar or the like have been made in order to prevent collision accidents caused by drivers' carelessness or errors of judgment on expressways. However, the ultrasonic radar is influenced by noise, the laser radar or infrared radar is influenced by weather (rain, fog, or snow) or by dust, and the picture sensor has a disadvantage of complicated processing technology, so that each lack practical use. In contrast, the electric wave radar is not significantly influenced by weather, and therefore frequently used for vessels or airplanes, but actually any satisfactory electric wave radar for a vehicle is not provided yet, since the electric wave radar detects clutter from surrounding objects or a road surface. However, a millimeter-wave radar has advantages as described hereinafter. The millimeter-wave radar is shorter in wavelength compared with a microwave radar, thus making it possible to have the following advantages. A transmitting/receiving antenna thereof can be reduced in size (so that a vehicle can be easily equipped with the antenna); the width of an antenna beam can be narrowed (which makes it easier to avoid clutter from surrounding objects); and the relative velocity of objects can be detected with high precision by Doppler frequency.

More specifically, a vehicle with a millimeter-wave radar is provided with a millimeter-wave transmitting/receiving antenna fixed on the front surface of the vehicle, and detects the distance and the relative velocity between the vehicle and objects by receiving with a receiving antenna a reflected wave of a transmitting wave which is transmitted ahead of the vehicle from a transmitting antenna and reflected by the objects. Incidentally, a pulse method, a two frequency CW method, a FM-CW method and the like are used for data processing. In order to detect more than one object at the same time, a filter bank or frequency analysis is used. A fixing position of the millimeter-wave transmitting/receiving antenna to the vehicle is about 70 centimeters from a ground surface on a front surface of the vehicle.

However, a conventional fixing position of the millimeter-wave transmitting/receiving antenna (about 70 centimeters from the ground surface) is intended for vehicles operating at high speed on expressways where the road surface is paved, but is not intended for vehicles for construction and the like operating on an unpaved road surface. Thus, if the above-described conventional art is used for the vehicles for construction and the like without any change, the following disadvantages occur.

(1) A vehicle operating on an unpaved road surface causes pitching or rolling because of unevenness of the road surface or winding. The influence by rolling can be settled, if a transmitting and a receiving antenna are respectively shaped into almost square, for example. But, the influence by pitching, which cannot be compensated for only by change in an antenna shape, causes the vehicle to detect ground clutter, whereby the vehicle cannot detect objects satisfactorily.

(2) Courses of vehicles operating on roads in construction sites, mines, quarries, and the like are usually fixed. Accordingly, researches on fleet operation by more than one unmanned vehicle have been enthusiastically conducted. In the aforesaid fleet operation, vehicles store course data which was previously obtained by teaching, or course data is given to the vehicles from the outside by various sorts of communication means each time. However, on an unpaved road surface, the slip ratio of wheels, for example, changes significantly, depending on weather (rain or snow), soil quality or the like. As a result, even if data on distance and velocity is obtained by detecting the rotational speed of a wheel or the like, the data can be imprecise. Therefore, fleet operation cannot be achieved only with the course data. This is because even if the course data of "turn to the right after operating a certain distance," for example, is given, "a certain distance" cannot be exactly detected. Needless to say, the position or altitude of a vehicle can be confirmed by GPS, but it is well known that the position or altitude of a vehicle cannot be detected in a tunnel or in the shade of a mountain, since the vehicle is in the shadow relative to a satellite.

SUMMARY OF THE INVENTION

The present invention is provided to solve disadvantages of the above-described conventional art. An object of the present invention is to provide a vehicle with a millimeter-wave radar which can contribute to fleet operation by more than one unmanned vehicle without incurring ground clutter and without the influence of the pitching of the vehicle on an unpaved road surface.

The first vehicle with a millimeter-wave radar according to the present invention includes a millimeter-wave transmitting/receiving antenna fixed on a front surface thereof for detecting distance and relative velocity between the vehicle and objects by receiving with a receiving antenna a reflected wave of a transmitting wave which is transmitted ahead of the vehicle from a transmitting antenna and reflected by the objects. The millimeter-wave transmitting/receiving antenna has an antenna beam width of about 4 degrees and an antenna fixing height on the front surface of the vehicle measured from the ground surface of about 1 to 2 meters, and a horizontal angle of a center of the antenna beam of not less than about −4 degrees.

According to the above-described structure, ground clutter is not normally detected. Thus, every peak value of reflection intensity of detected reflection waves can be assumed to be some object. As to a horizontal angle, minus means downward from a horizontal line.

The second vehicle with a millimeter-wave radar includes a millimeter-wave transmitting/receiving antenna fixed on a front surface thereof for detecting distance and relative velocity between the vehicle and objects by receiving with a receiving antenna a reflected wave of a transmitting wave which is transmitted ahead of the vehicle from a transmitting antenna and reflected by the objects. The millimeter-wave transmitting/receiving antenna has an antenna beam width of about 4 degrees and an antenna fixing height on the front surface of the vehicle measured from the ground surface of about 1 to 2 meters, and further includes a pitching angle detecting means for detecting a pitching angle of the vehicle, a control means for receiving a detection signal from the pitching angle detecting means and outputting a signal for rotating the millimeter-wave transmitting/receiving antenna so as to make a center of an antenna beam have at least a horizontal angle of about not less than −4 degrees, and an antenna rotating means for inputting a signal from the control means and rotating the millimeter-wave transmitting/receiving antenna in a vertical direction.

According to the above-described structure, just like the first aspect of the invention, objects can be detected without incurring ground clutter. Moreover, since the horizontal angle of the antenna beam center is controlled to be at least about not less than −4 degrees, objects can be automatically detected without the influence of pitching of the vehicle.

In addition, in the structure of the aforesaid first and second aspects of the invention, the vehicle with the millimeter-wave radar may further include a storage element for storing course data of the vehicle in advance, an extraction element for extracting a superimposed object when a part or all of plural detected objects are the superimposed object, and an identification element for comparing the extracted superimposed object with the stored course data and identifying the superimposed object.

According to the aforesaid structure, under the first aspect of the invention, a vehicle does not incur ground clutter. Under the second aspect of the invention, a vehicle does not incur ground clutter and is not influenced by pitching of the vehicle on an unpaved road surface. In addition, when plural detected objects are superimposed, the superimposed object is identified from the course data which is previously stored. Therefore, the superimposed object is identified without being influenced by differences in weather (rain or snow), the quality of soil, or the like, for example, as a uphill slope, curve, cliff in curve, or single object which continuously stand forward. In other words, the most suitable operation for each detected object (operating information such as deceleration, braking, steering, speed changing, or the like) can be given to the vehicle itself. Consequently, if the aforesaid structure is applied to fleet running by more than one unmanned vehicle in construction sites, mines, quarries, and the like, the fleet operation can be performed with greater certainty.

BRIEF DESCRIPTION OF THE DRAWINGS

FIG. 6 is a chart which shows the influence of height on the maximum detecting width, detectable range, and maximum detecting length;

FIG. 7 is a chart which shows the influence of height and a horizontal angle on received intensity;

FIG. 8 is a chart which shows the influence of height and distance on person detecting performance; and FIG. 9 is a chart showing a case in which a single object or a superimposed object is detected.

DETAILED DESCRIPTION OF THE INVENTION

Preferable embodiments of the present invention will now be described in detail with reference to the attached drawings.

Figure 1B:
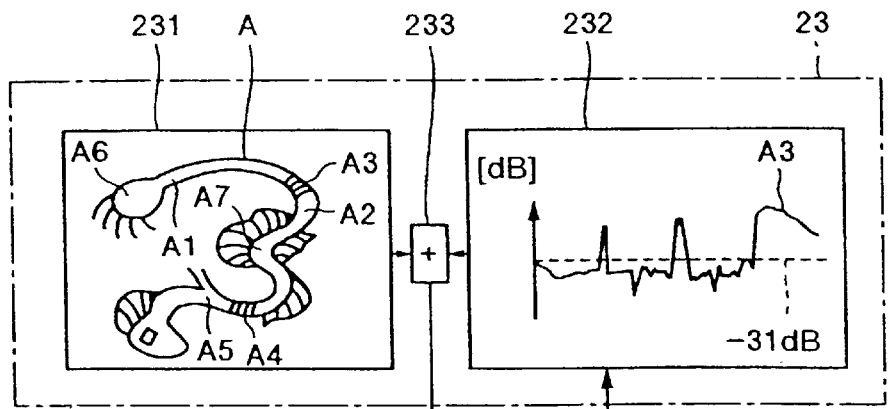
FIGS. 1(a)–(b) are a side elevational view of a vehicle with a millimeter-wave radar according to the present invention and an illustration of the course data.
Figure 1A:
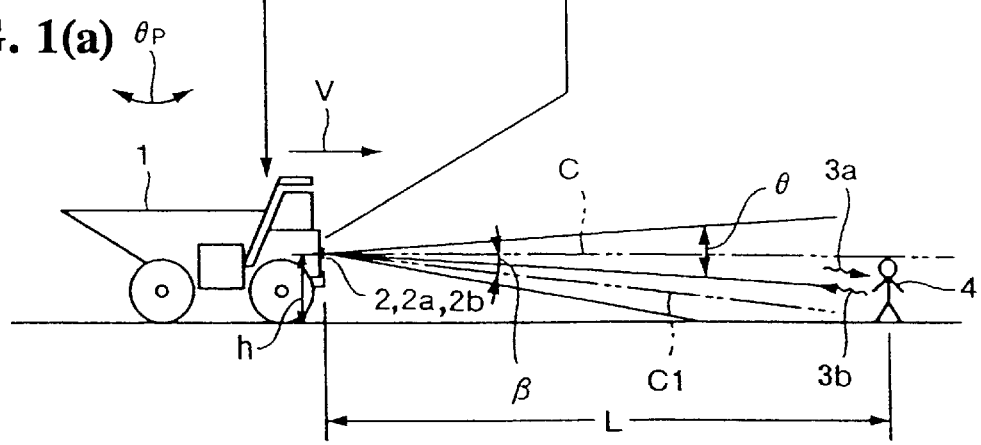
Figure 4:
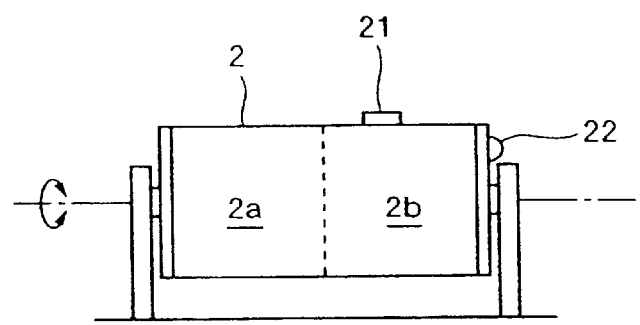
FIG. 4 is a front view of a millimeter-wave antenna according to the present invention.

The first embodiment will now be described with reference to FIGS. 1(a)–(b) to FIG. 4 and FIG. 6 to FIG. 8. As shown in FIG. 1(a), a vehicle 1 includes a millimeter-wave transmitting/receiving antenna 2 fixed on a central portion of a front surface thereof. As shown in FIG. 4, the millimeter-wave transmitting/receiving antenna 2, has an integral structure in which a transmitting antenna 2a and a receiving antenna 2b are disposed adjacent to each other. A transmitting wave 3a is transmitted ahead of the vehicle 1 from the transmitting antenna 2a, and a reflected wave 3b (which is called a backward scattered wave) reflected by collision with an object 4 is received by the receiving antenna 2b. Thus, the vehicle 1 is equipped with a millimeter-wave radar for detecting distance L and velocity V between the vehicle 1 and the object 4.

A millimeter wave is an electromagnetic wave with a wave length $\lambda$ of 1 to 10 millimeters (namely, 300 to 30 GHz). In the present embodiment, a millimeter wave with a wave length $\lambda$ of ≅5 mm (59.5 GHz) is used, and frequency analysis by FFT (fast Fourier transform) is conducted under a FM-CW method.

Figure 2:
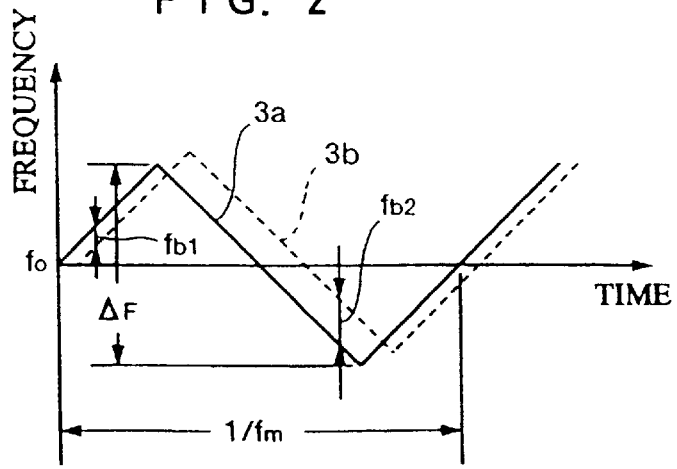
FIG. 2 is an explanatory view of the principle of data processing in a FW-CW method according to the present invention.

As shown in FIG. 2, in the FM-CW method, a millimeter wave (a carrier wave) is modulated with a signal wave (a chopping wave in this embodiment), and a transmitting wave 3a and a receiving wave 3b are mixed to obtain beat frequency fb1 and fb2. Thereafter, the distance L and the relative velocity V between the vehicle 1 and the object 4 are detected with the following general equations (1) and (2):

$$L = C \cdot (fb2 + fb1)/(8\Delta F \cdot fm) \quad (1)$$

$$V = C \cdot (fb2 - fb1)/4fo \quad (2).$$

In the above equations, C represents the velocity of light, fbi represents "beat frequency in an increase side" (see FIG. 2); fb2 represents "beat frequency in a decrease side" (see FIG. 2); $\Delta F$ represents deviation range of frequency (75 MHz in this embodiment); fm represents frequency of the aforesaid chopping wave (781.25 kHz in this embodiment); and fo represents the frequency of the aforesaid millimeter-wave (59.5 GHz).

Incidentally, FIG. 2 is an explanatory view in which the object 4 is single. However, in order to detect more than one such object 4, processing such as frequency analysis, filter bank, or the like is further made. FFT is adopted in this embodiment. In other words, as shown in FIG. 1(b), the receiving wave 3b has different receive intensity (the degree of reduction in intensity of the receiving wave 3b as against intensity of the transmitting wave 3a) depending on the distance L to the object 4, the direction to the object 4 (angle formed between the center C of the antenna beam and the direction of the object 4 which is seen from the millimeter-wave transmitting/receiving antenna 2), effective reflection area of the object 4, and the like. In FFT, the predetermined threshold value is set in receive intensity, and the beat frequency of the receiving wave 3b with receive intensity which is larger than the threshold value is extracted. When a threshold value is set and more than one peak value is extracted from the receiving wave 3b as described above, the distance L and the relative velocity V concerning each of more than one object 4 can be detected.

In order to fix the above-described millimeter-wave transmitting/receiving antenna 2 to the vehicle 1, such as a large-sized dump truck or the like which runs on an unpaved road surface in construction sites, mines, quarries, and the like, this embodiment is required to satisfy the following five requirements in consideration of the width of vehicle, travel speed, braking distance and the like.

First requirement: When the distance L is about 10 meters ahead of the vehicle 1 and the object 4 is a standing person (who is 1.5 meters to 2 meters in height), the object 4 can be detected.

Second requirement: When the distance 1 is about 100 meters, another vehicle 1 in front can be detected.

Figure 3:
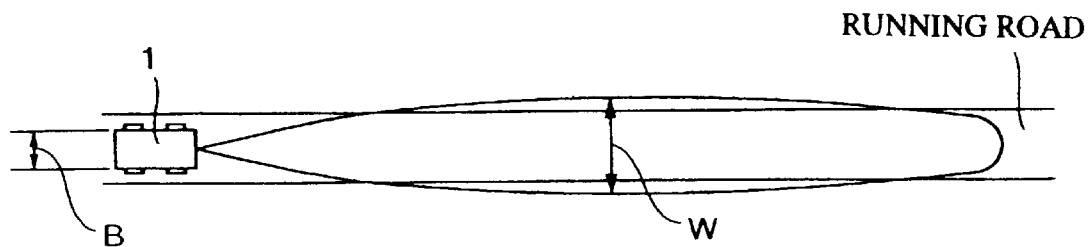
FIG. 3 is an explanatory view of the running vehicle with the millimeter-wave radar according to the present invention.

Third requirement: As shown in FIG. 3, distant detection width W is about 1.2 to 1.4 times vehicle width B. Therefore, since the width B of the vehicle 1 is about 3 meters, W≅3.6 meters to 4.2 meters is desirable. Incidentally, the vehicle 1 is small-sized as a dump truck for a mine. But, a larger-sized dump truck, for example, 120-ton class dump truck has B≅7 meters. In this large-sized dump truck, when the millimeter-wave transmitting/receiving antenna 2 itself is used, a total of two millimeter-wave transmitting/receiving antennas 2 may be fixed 3 meters to 4 meters apart in a lateral direction on the front surface of the vehicle 1.

Fourth requirement: The millimeter-wave transmitting/receiving antenna 2 needs to be small in size in consideration of fixing it on a front surface of a radiator of the vehicle 1. The antenna is fixed on the front surface of the radiator in order not to lower cooling capacity (namely, heat balance) of the radiator.

Fifth requirement: When an object is detected, ground clutter should not be incurred.

In order to satisfy the aforementioned five requirements, the spread of millimeter-wave shown in FIG. 1(*a*), that is, an antenna beam width θ is taken notice of in this embodiment. The following equation (3) is a general equation of the antenna beam width θ:

$$\theta \cong 70 \cdot \lambda/D \qquad (3)$$

Here, θ is an angle at which antenna gain is one half (½) of the antenna gain in the center C of the antenna beam which is the maximum, and D is an antenna effective length of each of the transmitting antenna 3a and the receiving antenna 3b. In the millimeter-wave transmitting/receiving antenna 2 in this embodiment, as shown in FIG. 4, both the transmitting antenna 2a and the receiving antenna 2b are square flat antennas, the external size, including the box size, is 100 mm×200 mm, and each antenna effective length D is about 85 millimeters. Therefore, in this embodiment, according to the equation (3), θ≅4° is obtained.

According to the equation (3), D≅117 mm in θ=3°, and D≅177 mm in θ=2° are obtained, respectively. Specifically, when it is intended that the antenna beam width θ be narrowed, the millimeter-wave transmitting/receiving antenna 2 becomes very large in size, which does not satisfy the aforesaid fourth requirement. Moreover, linearity of the transmitting wave 3a and the receiving wave 3b increases. Hence, without scanning in vertical and lateral directions by the millimeter-wave transmitting/receiving antenna 2, a person and a vehicle operating ahead can not be detected. (In other words, the aforesaid first to third requirements can not be achieved.) Naturally, with scanning downward by the millimeter-wave transmitting/receiving antenna 2, the influence of ground clutter will be incurred, whereby the aforesaid fifth requirement also cannot be achieved.

On the other hand, according to equation (3), D≅70 mm for θ=5°, and a D≅58 mm for θ=6° are obtained, respectively. Specifically, when it is intended that the antenna beam width θ is widened, the millimeter-wave transmitting/receiving antenna 2 can be reduced in size, thereby satisfying the aforesaid fourth requirement. However, as the antenna beam width θ becomes widened, not only ground clutter is accepted but an object outside a traveling road is detected. As a result, the first to the third requirements and the fifth requirement can not be achieved.

Figure 6:
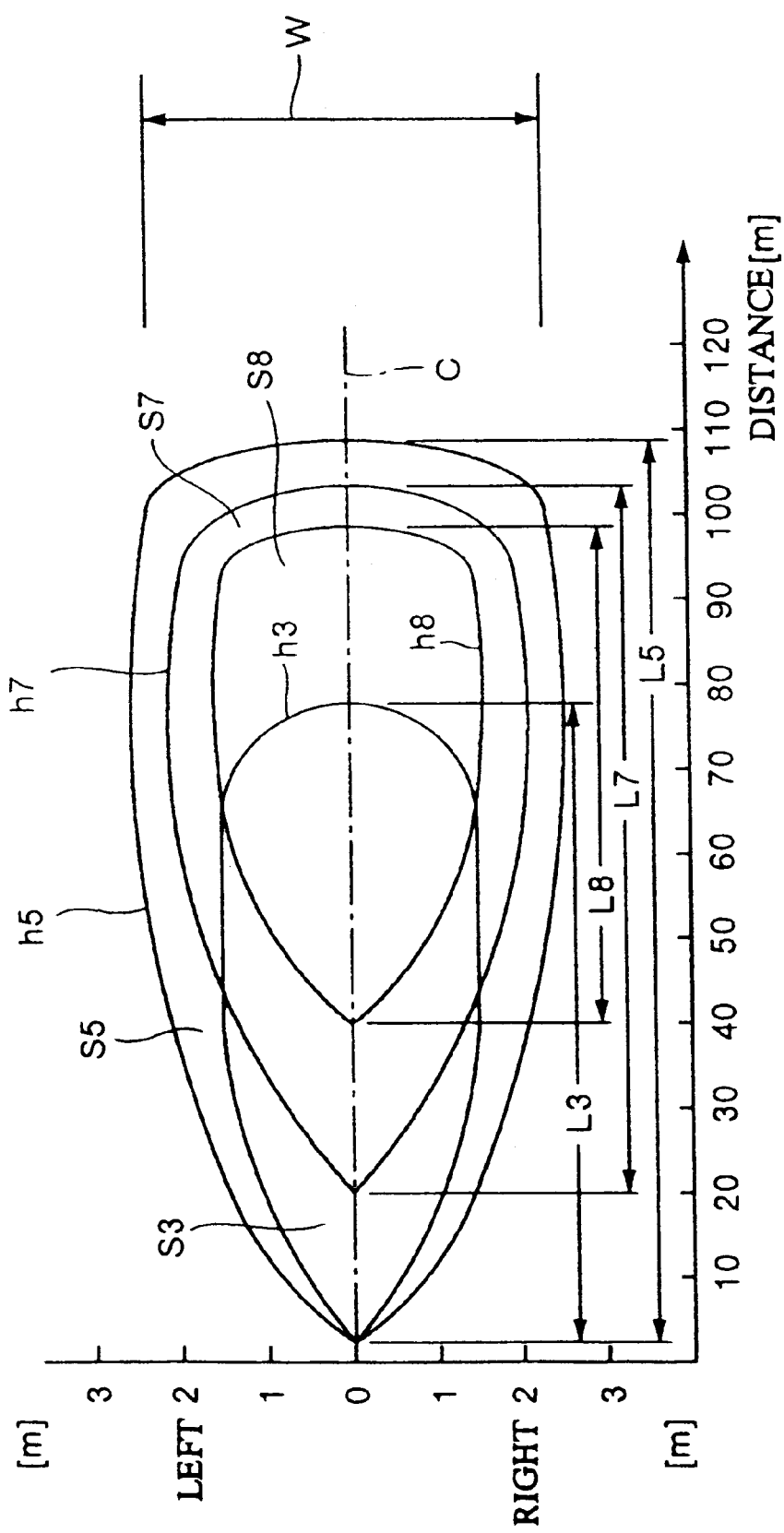
FIG. 6 to FIG. 9 show characteristics of the millimeter-wave transmitting/receiving antenna according to the present invention.

In other words, all things considered, the antenna beam width θ is preferably about 4 degrees. About 4 degrees is approximately within 4±0.5°. However, all described above is not enough to satisfy the aforesaid requirements completely, and the antenna needs to be further limited as described hereinafter. First, if an antenna fixing height h measured from the ground surface changes variously, there occurs some cases where satisfactory results cannot be obtained as shown in FIG. 6. FIG. 6 describes each maximum detection width W, each detectable range S3, S5, S7, and S8, and each maximum detection length L3, L5, L7, and L8, when the height h is h3=0.7 m, h5=1 m, h7=2 m, and h8=2.5 m, respectively. As is evident from FIG. 6, the maximum detection width W hardly changes, thus satisfying the third requirement.

Meanwhile, the detectable ranges S3, S5, S7, and S8, and the maximum detection lengths L3, L5, L7, and L8 change significantly, and some of them cannot achieve the first, the second, and the fifth requirements. Incidentally, the fourth requirement is already satisfied. Of the above four heights, h5=1 m and h7=2 m satisfy the first, the second, and the fifth requirements. Specifically, when the antenna beam width θ is set for about 4 degrees, it is preferable that the height h measured from the ground surface is about 0.9 meters to 2.1 meters.

Figure 7:
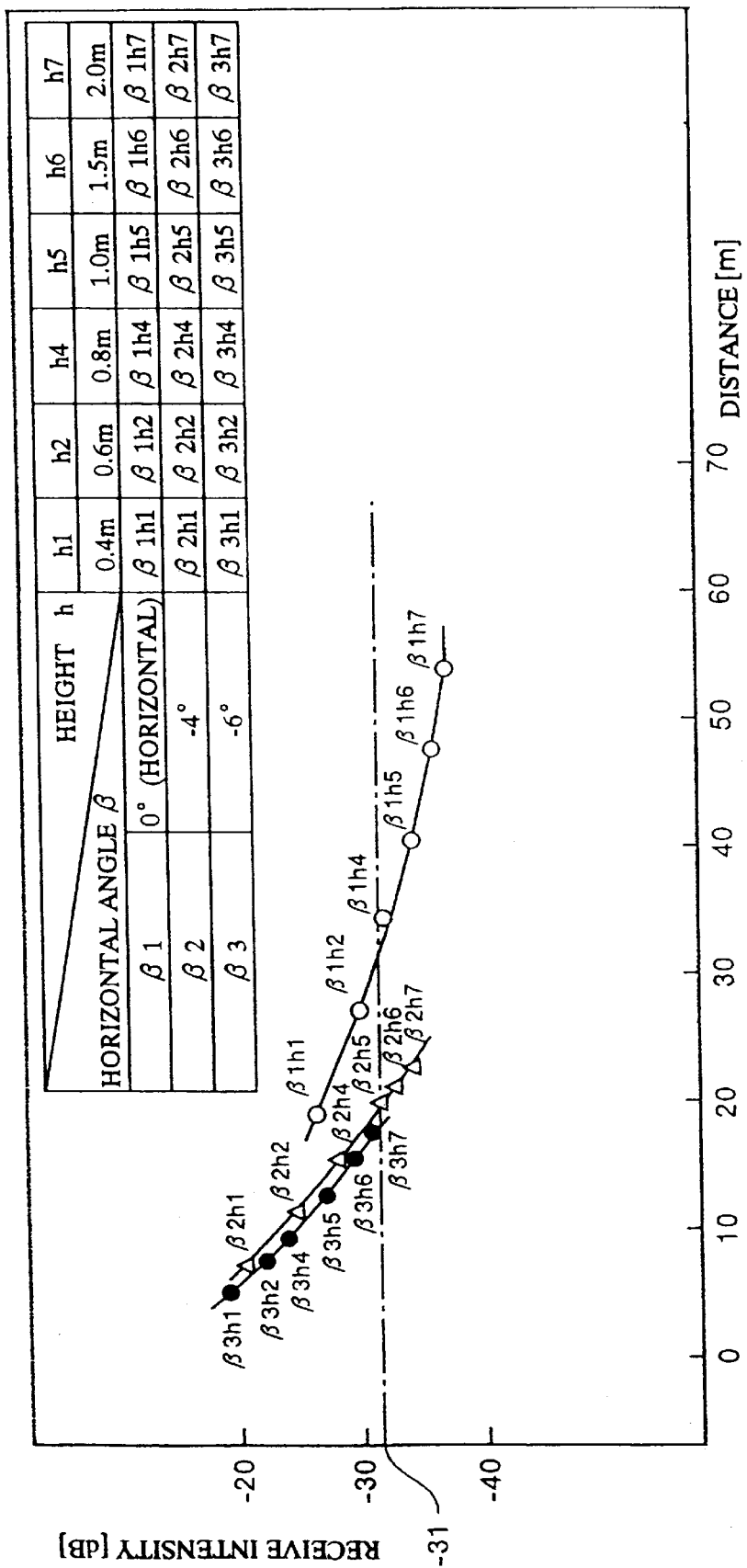

FIG. 7 shows the degree of satisfaction of the aforesaid fifth requirement. In FIG. 7, the millimeter-wave transmitting/receiving antenna 2 with the antenna beam width of 4 degrees is fixed on the central portion of the front surface of the vehicle 1 at six different heights h, that is, h1=0.4 m, h2=0.6 m, h4=0.8 m, h5=1 m, h6=1.5 m, and h7=2 m. In addition, for each height h, a horizontal angle β is set for β1=0° (horizontal), β2=−4°, and β3=−6°. Accordingly, when a side view of the vehicle 1 is taken, the influence of ground clutter is visible. As shown in FIG. 7, in β1=0°, the receive intensity of the receiving wave 3b as ground clutter drops below −31 dB, when the millimeter-wave transmitting/receiving antenna 2 has heights of h4=0.8 m (dot β1h4), h5=1 m (dot β1h5), h6=1.5 m (dot β1h6), and h7=2 m (dot β1h7). In β2=−4°, the receive intensity drops below −31 dB, when the millimeter-wave transmitting/receiving antenna 2 has heights of h5=1 m (dot β2h5), h6=1.5 m (dot β2h6), and h7=2 m (dot β2h7). However, in β3=−6°, the receive intensity of the receiving wave 3b as ground clutter does not drop below −31 dB in any height.

In other words, it has been determined that in the millimeter-wave transmitting/receiving antenna 2 fixed at a height h of about 0.9 meters to 2.1 meters, if the lower limit of the horizontal angle β is set for 0 degree to −4 degrees (namely, β≧ about −4°), the receive intensity as ground clutter is always below −31 dB. The receive intensity −31 dB is a value which naturally appears as a peak value of the whole receive intensity of ground clutter obtained about 20 meters to 100 meters ahead of the vehicle 1, when the millimeter-wave transmitting/receiving antenna 2 with the antenna beam width θ of about 4 degrees is fixed at h=1 m to 2 m and the center C of the antenna beam is set for the horizontal angle β≅4°. In other words, all the receive intensity below this value (−31 dB) can be regarded as ground clutter.

Figure 8:
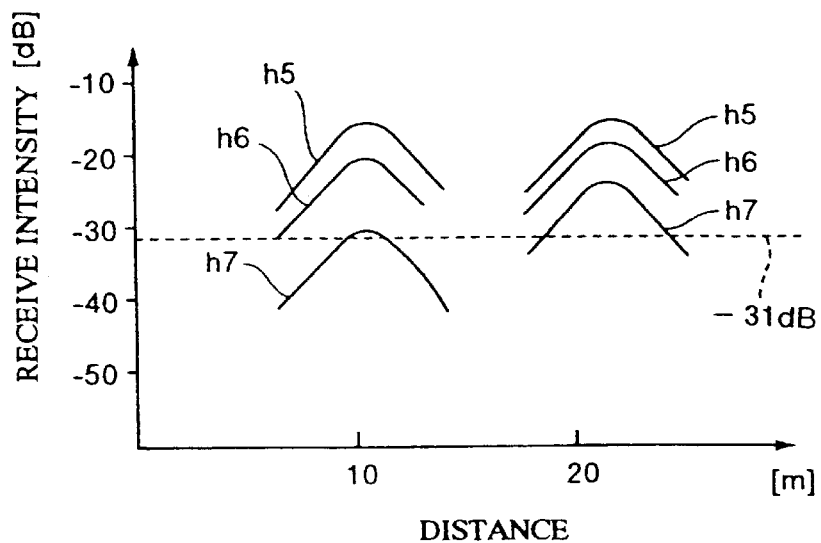

FIG. 8 shows degree of satisfaction of the above-described first requirement more clearly. The millimeter-wave transmitting/receiving antenna 2 with the antenna beam width θ=4° has the horizontal angle β of β1=0°, and is fixed at the heights h of h5=1 m, h6=1.5 m, and h7=2 m. FIG. 8 shows the results of detecting persons (who are 1.5 meters in height), each standing 10 meters and 20 meters ahead of the vehicle 1, by the millimeter-wave transmitting/ receiving antenna 2 thus set. Specifically, in h7=2 m, a person standing 10 meters ahead can be barely detected in consideration of ground clutter (below −31 dB). Supposing the person is 1.8 meters in height, no hindrance to person detection occurs. In h>2 m, the person cannot be detected. Person detection in h5=1 m, and h6=1.5 m can be conducted without any hindrance. On the other hand, when a standing person is 20 meters ahead, person detection is possible in all heights h (h5=1 m, h6=1.5 m, and h7=2).

As is clear from the above test results and explanation, if the millimeter-wave transmitting/receiving antenna 2 with the antenna beam width θ of about 4 degrees is fixed at the height h of about 1 meter to 2 meters from the ground surface and the horizontal angle β of the center C of the antenna beam thereof is set for not less than about −4°, all the aforementioned first to fifth requirements are satisfied, which makes it possible to perfectly detect more than one object.

As is evident from the aforesaid first embodiment, when the millimeter-wave transmitting/receiving antenna 2 with the antenna beam width θ of about 4 degrees is fixed at the height h of about 1 meter to 2 meters from the ground surface and the horizontal angle β of the center C of the antenna beam thereof is set for not less than about −4, as shown in FIG. 7, the receive intensity "below −31 dB" can be regarded as influenced by ground clutter. Therefore, if −31 dB is set as threshold value and anything with the receive intensity larger than the threshold is extracted, everything which is extracted is an object.

The second embodiment is based on the results of the first embodiment, and is described with reference to FIG. 4, FIG. 5, and FIG. 1(a)–(b). The vehicle 1 in the second embodiment includes a level 21 serving as a pitching angle detecting means for detecting a pitching angle θp of the vehicle 1, an antenna rotating means 22 for rotating the millimeter-wave transmitting/receiving antenna 2 on a radiator grille in a vertical direction, and a control means 23 composed of a microcomputer and the like. The control means 23 receives a detection signal from the level 21, and outputs a signal to the antenna rotating means 22 to rotate the millimeter-wave transmitting/receiving antenna 2 by an angle of rotation θud so that the horizontal angle β of the center C of the antenna beam is at least not less than about −4 degrees. When the horizontal angle becomes β=−6° due to pitching, for example, the antenna rotating means 22 rotates the millimeter-wave transmitting/receiving antenna 2 by the angle of rotation θud=+6° in a minus direction in relation to a minus of the aforesaid β=−6°, that is, in an upward direction. Consequently, the horizontal angle β is controlled to be 0 degrees to about −4 degrees.

In the antenna rotating means 22 in this embodiment, a rack is meshed with a pinion which is disposed on an end of a shaft of a step motor so that the rack can move in front and behind, and a front end of the rack is fixed to the millimeter-wave transmitting/receiving antenna 2 through a universal joint. Accordingly, if the control means 23 sends a driving signal to the step motor, the millimeter-wave transmitting/ receiving antenna 2 rotates by an angle (the angle of rotation θud) in compliance with the signal.

According to the second embodiment, even if the vehicle 1 operates on an unpaved road surface and pitching occurs because of unevenness of the road surface or winding, the pitching angle detecting means 21 detects the pitching angle θp and inputs the pitching angle θp to the control means 23, and the control means 23 directs the antenna rotating means 22 to rotate the millimeter-wave transmitting/receiving antenna 2 so that the horizontal angle β of the center C of the antenna beam is set for at least not less than about −4 degrees. As a result, even if the vehicle 1 pitches, it is not influenced by ground clutter.

Figure 5:
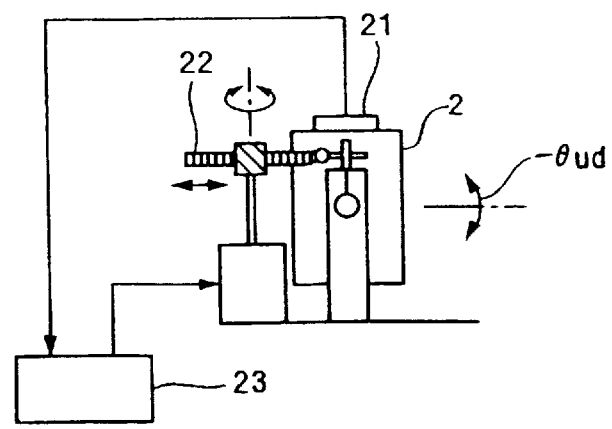
FIG. 5 is a side elevational view of the millimeter-wave antenna according to the present invention.

Next, the third embodiment will be described with reference to FIG. 1, FIG. 5 and FIG. 9. According to the above-described first and second embodiments, the millimeter-wave radar can detect the distance L and the relative velocity V to each of more than one object 4 without being influenced by ground clutter. However, with only the millimeter-wave radar, the detected object 4 cannot be identified. Therefore in this third embodiment, a storage element 231, an extraction element 232 and an identification element 233 are further added to the control means 23 in FIG. 5. The details are shown in FIG. 1(b). It is supposed that the vehicle 1 is unmanned and more than one vehicle 1 runs in a fleet. The vehicle 1 is made to run and take teaching of the course data A on a prescribed course so as to previously store in the storage element 231 a straight course A1, a corner A2, an uphill slope A3, a downhill slope A4, an intersection A5, a dumping soil position A6 and the like, and the distance L, the most suitable velocity Vo and the like in each aforesaid position.

The extraction element 232 is as follows. Distance resolution ΔL of a detected object in a millimeter-wave radar is given by the following general equation (4). In this embodiment, ΔL=2 m is obtained.

$$\Delta L = C/2\Delta F \qquad (4)$$

Figure 9:
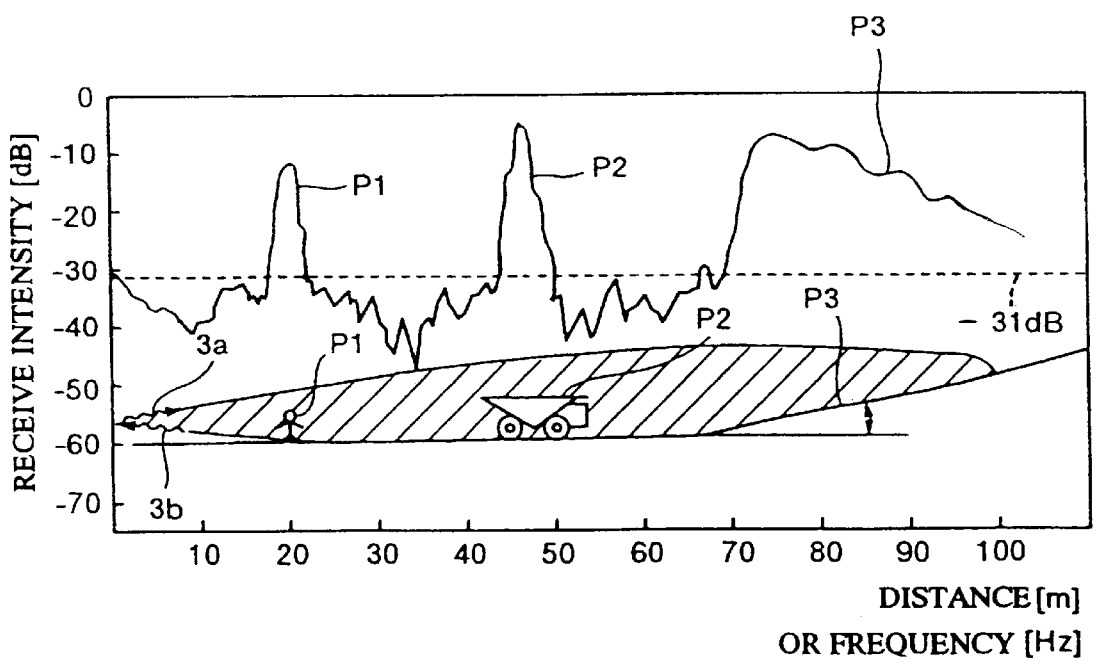

Accordingly, it is supposed that an object P1 is located 20 meters ahead, an object P2 is located 47 meters ahead and moreover an object P3 is superimposed from 65 meters ahead to far, respectively, as shown in FIG. 9. Incidentally, P1 to P3 are disposed at intervals of two meters or more (namely, not less than the distance resolution ΔL) from each other so that P1, P2, and P3 can be individually detected. Specifically, the distance L to the object P1 of 19 meters to 21 meters, the distance L to the object P2 of 46 meters to 48 meters, and the distance L to a starting end of the object P3 of 64 meters to 66 meters are accurately given. In this case, the objects P1 and P2 appear respectively as one peak value. Therefore, if either of deceleration and stopping is adopted as a corresponding operation signal in the vehicle 1, no problem occurs. In FIG. 9, the vertical axis shows receive intensity and the horizontal axis shows beat frequency, but the horizontal axis can be the distance L, since beat frequency (fb2+fb1) is proportional to the distance L as is evident from the above equation (1).

On the other hand, even if the object P3 is actually the uphill slope A3 as shown in FIG. 1(a), a cliff on the curve A7 in a ravine, a guardrail in a curve, and single objects such as the aforesaid P1 and P2, for example, continuously standing forward within 1 meter, all the above are detected as the object P3. Accordingly, only with the millimeter-wave radar, the object P3 cannot be identified as the uphill slope A3. In addition, if the object P3 is a curve or merely bristling with more than one single object, generally only deceleration of the vehicle 1 is good enough. However, if the object P3 is an uphill slope, it is generally desirable to lower a speed change gear as well as to decelerate the vehicle 1. But, if the vehicle 1 is an unmanned vehicle equipped with only the millimeter-wave radar, suitable steps cannot be taken depending on objects as described above.

Hence, the extraction element 232 first extracts the superimposed object P3 separately from other single objects P1 and P2 when the objects P1 to P3 are detected. The identification element 233 compares the superimposed object P3 extracted by the extraction element 232 with the course data A stored by the storage element 231, thereby identifying the superimposed object P3 as "the uphill slope A3" and directing the vehicle 1 to decelerate and to stop. The aforesaid comparison includes reference to past traveling record data.

In other words, according to the third embodiment, fleet operation by more than one unmanned vehicle 1 can be performed reliably. In the third embodiment, the storage element 231, the extraction element 232, and the identification element 233 are added to the control means 23 in FIG. 5. The above-mentioned three elements may be provided in a separately prepared controller (not shown) for fleet control which is composed of a microcomputer and the like.

INDUSTRIAL AVAILABILITY

The present invention is useful for a vehicle with a millimeter-wave radar which can contribute to fleet operation by more than one unmanned vehicle without incurring ground clutter and without influence of pitching of the vehicle on an unpaved road surface.

What is claimed is:

1. A vehicle with a radar for detecting distance and relative velocity between the vehicle and an object comprising:

a radar including a transmitting/receiving antenna;

a storage element for storing course data for said vehicle with said radar;

an extraction element for extracting a superimposed object from a plurality of objects detected by said radar in the course when said vehicle operates after the course data is stored; and an identification element for comparing the extracted superimposed object with the stored course data to identify the superimposed object;

wherein said extraction element extracts objects detected by said radar by selecting objects having a corresponding received signal intensity greater than a predetermined threshold.

2. A vehicle with a radar in accordance with claim 1, wherein said radar is a millimeter-wave radar.

3. A vehicle with a radar in accordance with claim 1, wherein said antenna beam width is about 4 degrees.

4. A vehicle with a radar in accordance with claim 3, wherein an antenna fixing height (h) on a surface of said vehicle measured from a ground surface is about 1 meter to about 2 meters, and a horizontal angle of a center of the antenna beam of not less than approximately −4 degrees.

5. A vehicle with a radar in accordance with claim 4, wherein said radar is fixed on a front surface of said vehicle with respect to a forward direction of travel.

6. A vehicle with a radar in accordance with claim 1, wherein said storage element stores course data for said vehicle by operating the vehicle over the course in advance.

7. A vehicle with a radar for detecting distance and relative velocity between the vehicle and an object comprising:

a radar including a transmitting/receiving antenna;

a pitching angle detector for detecting a pitching angle of said vehicle;

a controller for receiving a detection signal from said pitching angle detector and for outputting a signal for rotating the transmitting/receiving antenna;

an antenna rotator for inputting a signal from said controller and rotating the transmitting/receiving antenna in a vertical direction;

a storage element for storing course data of said vehicle;

an extraction element for extracting a superimposed object from a plurality of objects detected in the course when said vehicle operates after the course data is stored; and an identification element for comparing the extracted superimposed object with the stored course data and identifying the superimposed object;

wherein said extraction element extracts objects detected by said radar by selecting objects having a corresponding received signal intensity greater than a predetermined threshold.

8. A vehicle with a radar in accordance with claim 7, wherein said storage element stores course data for said vehicle by operating the vehicle over the course in advance.

9. A vehicle with a radar in accordance with claim 7, wherein said radar is a millimeter-wave radar.

10. A vehicle with a radar in accordance with claim 9, wherein said antenna beam width is about 4 degrees.

11. A vehicle with a radar in accordance with claim 10, wherein an antenna fixing height (h) on a front surface of said vehicle measured from a ground surface is about 1 meter to about 2 meters, and a horizontal angle of a center of the antenna beam of not less than approximately −4 degrees.

12. A vehicle with a radar in accordance with claim 11, wherein said horizontal angle of a center of the antenna beam is between approximately zero degrees and approximately −4 degrees.

13. A vehicle with a radar in accordance with claim 1, wherein said extraction element performs a frequency analysis on said received signal, and wherein said extraction element extracts a frequency component of said received signal having an intensity greater than a predetermined threshold.

14. A vehicle with a radar in accordance with claim 1, wherein said radar is adapted to detect an object having a height of approximately 1.5 meters when a distance to the object is approximately 10 meters.

15. A vehicle with a radar in accordance with claim 13, wherein said received signal intensity predetermined threshold is approximately −31 dB.

* * * * *